Sept. 25, 1956          C. ETIENNE          2,764,054
INSTRUMENTS FOR MEASURING ANGULAR DIFFERENCES
Filed March 24, 1953          2 Sheets-Sheet 1
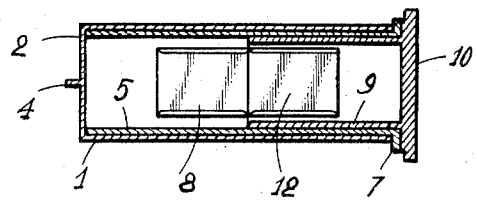
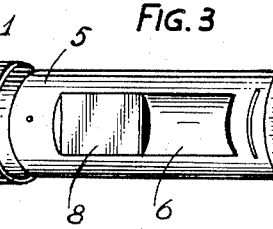 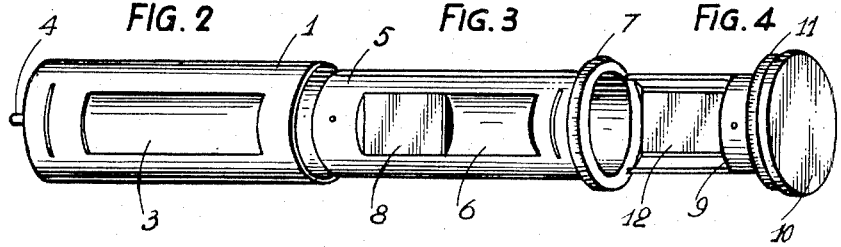 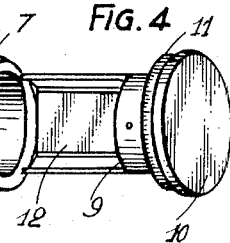
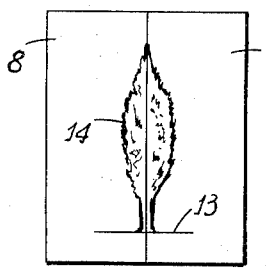 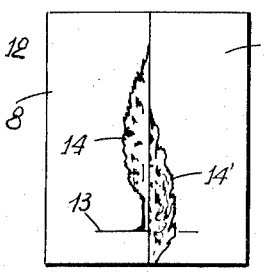 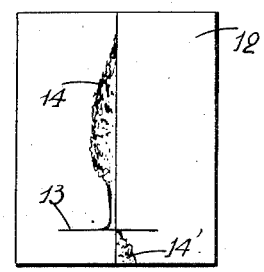
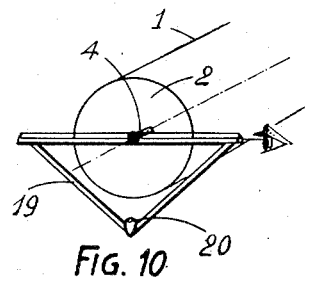

Sept. 25, 1956           C. ETIENNE           2,764,054
INSTRUMENTS FOR MEASURING ANGULAR DIFFERENCES
Filed March 24, 1953           2 Sheets-Sheet 2
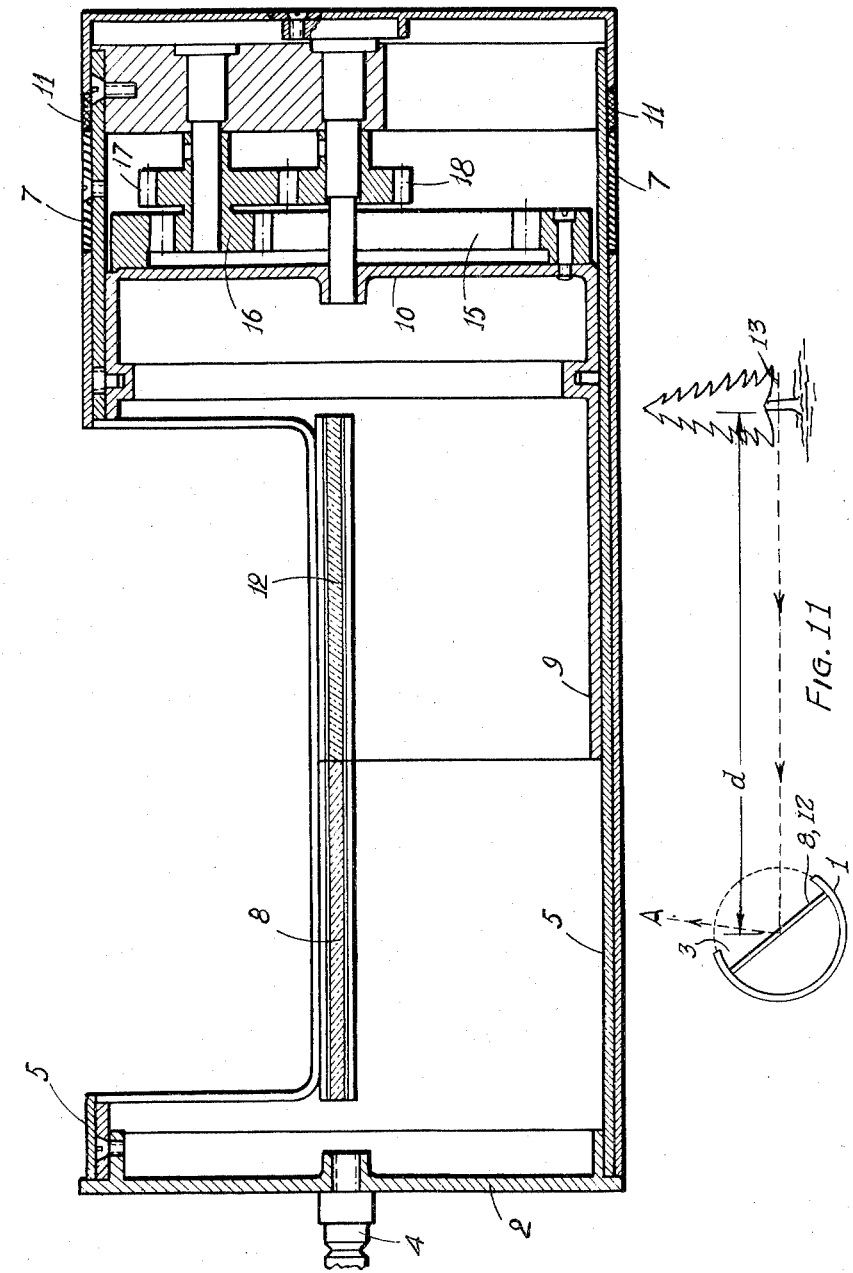

2,764,054

INSTRUMENTS FOR MEASURING ANGULAR DIFFERENCES

Christian Etienne, Puteaux, France

Application March 24, 1953, Serial No. 344,299

Claims priority, application France June 23, 1952

3 Claims. (Cl. 88—2.7)

This invention relates to an instrument for measuring the angular difference or displacement between two points, whereby any of various dimensions of visible objects may be accurately determined, at various distances, including such dimensions as elevations, widths, thickness, etc.

It is an essential object of the invention to provide a dimension measuring instrument based on the basic trigonometric relation inherent to right-angle triangles, namely that one side of the right angle therein equals the tangent of the angle remote from that side times the other side of the right angle.

Another object of the invention is to provide such an instrument which is simple, easy and cheap to construct, which does not require any particular training for operating it, which will yield accurate and rapid results, and one which is particularly suitable for use in various occupations and trades, including military engineering, surveying, public works, building construction, topography, forest surveying, and the like.

A further object of the invention is to provide such a measuring instrument which is practically incapable of misadjustment, which shows no systematic error, is compact, lightweight and requires no preliminary calibration prior to use.

According to the invention, the instrument comprises two planar mirrors so arranged that the reflective faces thereof are contained in a common plane when the instrument is in its null position, said mirrors being adapted to be rotated relative to each other, the angular displacement between the two mirrors during a measurement being indicated on a calibrated scale secured to one mirror, by means of a calibrated vernier rotatable with the other mirror.

According to another feature of the invention, the theoretical axis of rotation of one mirror relative to the other mirror coincides with the longitudinal geometrical axis of the two planar mirrors when both reflective faces of the mirrors are contained in a common plane.

Further features and advantages of the invention will appear from the ensuing disclosure made with reference to the accompanying drawings, which illustrate diagrammatically and merely by way of example, two forms of embodiment of the instrument for measuring the angular difference or displacement between two points.

In the drawings:

Fig. 1 is a longitudinal sectional view of the assembled device, the reflecting faces of both its mirrors lying in a common vertical plane.

Figs. 2, 3 and 4 are perspective views illustrating, in juxtaposition, the three cylindrical elements of the device.

Fig. 5 is a longitudinal sectional view, on an enlarged scale, of a measuring instrument provided with demultiplying means.

Figs. 6, 7 and 8 are three diagrammatical views illustrating the manner in which is used the instrument for measuring an elevation; in Fig. 7, the line 13 should be shown higher, and in Fig. 8 still higher, but the views are as shown to permit herein illustration of the whole tree to simplify the explanation.

Fig. 9 is a diagrammatic view of one page of a table indicating heights to be determined as a function of readings made with the device.

Fig. 10 is a perspective view of an accessory part whereby the horizontality of the line of sight may be accurately ascertained.

Fig. 11 is a schematic end elevational view showing the assembled device in use.

Referring to Figs. 1 to 4, the measuring device of the invention comprises an outer cylindrical sheath or casing 1 having an end wall 2 and a side wall formed with a window 3. Projecting from the end wall 2 at its centre is a pin 4 whose function will be indicated later.

The dimensions of the cylindrical casing 1 are so determined that the casing may be mounted for rotation externally on an outer cylindrical part 5 formed in its side wall with a window 6 similar in dimensions to those of the window 3. The positions of the two windows 3 and 6 are such that they may be brought into registration. The outer cylindrical part 5 is provided at that one of its ends remote from the end inserted into the cylindrical casing 1, with a flange or limb 7 calibrated in degrees.

Mounted by means of slideways for example within the cylindrical part 5 is a planar mirror 8 whose silvering lies exactly in a diametric plane of said cylindrical part. The mirror 8 is so dimensioned and positioned that it occupies one half the length of the windows 3 and 6, while its width is substantially equal to that of the said windows.

Inserted in the cylindrical part 5 for rotation is an inner cylindrical part 9 sealed with an end wall 10 provided with a limb 11 calibrated in minutes. This outer cylindrical part is provided with a mirror 12 identical with the mirror 8, the mirror 12 being so mounted that its reflecting face and that of the mirror 8 may be made to lie in a common plane. When the inner cylindrical part 9 is housed in the cylindrical part 5, the limb 11 calibrated in minutes lies adjacent to the limb 7 calibrated in degrees. Moreover the calibrations on both limbs 7 and 11 are so formed that the zero mark of one calibration registers with the zero mark of the other when the reflecting faces of both mirrors 8 and 12 lie in a common plane.

For measuring an elevation, for example, the practical operation of the device is as follows:

Assuming (see Figs. 6 to 8 and 11) that it is desired to measure the height of a tree, the operator first draws on the trunk of the tree, as with a piece of chalk, a reference mark 13 at a distance from ground level corresponding to the height at which he will hold the instrument during measurement. He then moves off to an arbitrarily selected distance "$d$" from the tree being measured.

The operator may hold the apparatus as shown in Fig. 11, for instance against his chest like a reflex camera, so that he needs to look down into the aligned mirrors 8, 12 to see the tree.

Next, with both mirrors of the instrument still aligned in a common plane, corresponding to the condition in which both zero marks in both the degrees and minutes calibrations stand in registry, the operator observes the tree in both mirrors, so that one half 14 of the tree is seen in the mirror 8 and the other half 14' of the same tree is visible in mirror 12 (Fig. 6). He then turns the two cylindrical parts 5 and 9 in opposite directions from each other so as to bring the reference mark 13 seen in mirror 8 into registry with the upper end of the part 14' of the tree as seen in the mirror 12 (Fig. 8). In this position of the instrument, designating $\beta$ the angle formed between the two mirrors as indicated on the calibrations of the limbs 7 and 11, it follows that the angle between the incident rays is $\alpha = 2\beta$, whence it follows that the height H to be measured is $$H = d \operatorname{tg} 2\beta$$

"d" being the horizontal distance measured from the operator to the foot of the tree whose height is being determined.

Assuming the distance "d" to be equal to 10 meters, the line 13 drawn 0.80 meter above ground level and the measurements read off the calibrated scales to be 7 and 11, respectively, giving an angle of 24° 16' it is only necessary for the operator to refer to the table diagrammatically shown in Fig. 9, in order to ascertain that the height of the tree is 11.316 m.+0.80 m. or 12.116 m.

In the practical form of embodiment shown in Fig. 5, parts corresponding to those described with reference to Figs. 1 and 4 have been designated by the same reference characters. This embodiment differs from the foregoing one in that a reducer gear drive comprising an internal gear annulus 15 and three gears 16, 17, and 18 is interposed between the two cylindrical parts 5 and 9 rotatable the one within the other and supporting the mirrors 8 and 12.

The center gear 18 is secured on a first central shaft which, in turn, is secured to the casing 1. The gear 18 meshes with a gear 17 that is secured on a second shaft which is revolubly journalled in the part 5; the gear 16 is connected to the gear 17 and revolves with the said second shaft and meshes with the annulus 15 which is secured to the wall 10 of the part 9. By this arrangement, turning of one of the parts 5 or 9 will result in opposite turning of the other part.

Owing to the construction of the device in which the planar mirrors are placed strictly on the axis of rotation, the instrument possesses no systematic error, so that no correction need be made in the readings given by the instrument during measurements. The sole possible cause of error is the difference in level in case the base line is not horizontal. Although this source of error may be eliminated by making either a transverse sighting operation, or two operations from two points located one above and the other below the object to be measured at equal distances therefrom, the arithmetical mean being then taken of the resulting readings, either of these methods may nevertheless still leave a residual error of the order of 1%. In order to eliminate this source of error, the device is completed by an accessory part or attachment consisting of a frame 19 in the shape of an isosceles triangle provided at its apex opposite from the larger base, with a weight 20 and adapted to be suspended for oscillation from the midpoint of its larger base, about the pin 4 projecting from the end wall 2 of the cylindrical casing 1. This attachment, as visible from Fig. 10, makes it possible to determine a horizontal base line for the sighting operation, since the attachment just described is so balanced that, when the device is set up, the operator is sighting along a direction parallel to the horizon.

It is to be understood that the device has only been described and illustrated by way of explanation and not of limitation and that many modifications may be made in the details of the embodiment shown without exceeding the scope of the invention. Thus, the size of the device, as well as the materials used in making it may be selected with regard to each individual use contemplated for it.

What I claim is:

1. An instrument of the type specified, comprising a cylindrical casing with an apertured side, an outer tubular member rotatable in said casing and having an apertured side registering with the aperture in the side of the casing, reflecting means in said outer member having a planar reflective surface registering with said apertures, an inner tubular member in telescoping position in and rotatable in the outer member and a further reflecting means secured in said inner member having a planar reflective surface adjacent said first surface and defining a common reflective plane therewith in a null relative position of said inner and outer members, means for simultaneously rotating said members in opposite directions relative to said casing, and cooperating annular scale means on said members for indicating the relative angular positions thereof.

2. An instrument of the type specified, comprising a cylindrical casing with an apertured side, an outer tubular member having an apertured side and rotatable in said casing, reflecting means in said outer member having a planar reflective surface directed towards the apertured side of said member, an inner tubular member rotatable in the outer member and a further reflecting means secured in said inner member having a planar reflective surface adjacent said first surface and defining a common reflective plane therewith in a null relative position of said members, means for rotating one of said members in one direction relative to said casing at a first rate, and for simultaneously rotating the other member in the opposite direction at a second and different rate, and cooperating annular vernier scales on said members for indicating the relative angular displacements thereof from said null position.

3. An instrument as claimed in claim 2, which comprises a reducing reverser gear drive between said inner and outer members.

References Cited in the file of this patent

UNITED STATES PATENTS

| | | |
|---|---|---|
| 1,970,543 | Carbonara | Aug. 21, 1934 |

FOREIGN PATENTS

| | | |
|---|---|---|
| 17,554 | Germany | Apr. 18, 1882 |
| 389,686 | France | July 6, 1908 |
| 561,633 | Great Britain | May 26, 1944 |